US009692705B1

(12) United States Patent
Zhou et al.

(10) Patent No.: US 9,692,705 B1
(45) Date of Patent: Jun. 27, 2017

(54) SYSTEM AND METHOD FOR MEASUREMENT OF FLOW STATISTICS

(71) Applicant: Google Inc., Mountain View, CA (US)

(72) Inventors: Junlan Zhou, Sunnyvale, CA (US); Zhengrong Ji, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 177 days.

(21) Appl. No.: 14/098,729

(22) Filed: Dec. 6, 2013

(51) Int. Cl.
*H04L 12/851* (2013.01)

(52) U.S. Cl.
CPC ................................ *H04L 47/2433* (2013.01)

(58) Field of Classification Search
None
See application file for complete search history.

(56) References Cited

U.S. PATENT DOCUMENTS

| 6,542,154 | B1* | 4/2003 | Knittel | G06T 15/20 |
| | | | | 345/424 |
| 9,009,179 | B2* | 4/2015 | Cohen | G06F 17/30958 |
| | | | | 707/758 |
| 2003/0067874 | A1* | 4/2003 | See | H04L 12/4625 |
| | | | | 370/230.1 |
| 2005/0276262 | A1* | 12/2005 | Schuba | G06N 5/025 |
| | | | | 370/389 |
| 2011/0205931 | A1* | 8/2011 | Zhou | H04L 43/026 |
| | | | | 370/253 |
| 2013/0268549 | A1* | 10/2013 | Delling | G06F 17/30958 |
| | | | | 707/769 |
| 2013/0339537 | A1* | 12/2013 | Joy | H04L 65/1083 |
| | | | | 709/231 |
| 2014/0092745 | A1* | 4/2014 | Hui | H04W 28/12 |
| | | | | 370/236 |
| 2014/0282293 | A1* | 9/2014 | Lin | G06F 17/5081 |
| | | | | 716/52 |

OTHER PUBLICATIONS

"Chapter 4: Recursive Flow Classification: An Algorithm for Packet Classification on Multiple Fields", pp. 105-160, downloaded Oct. 10, 2013.
Hidell, et al., "Router Architecture Tutorial at Networking 2004" pp. 1-152, downloaded Oct. 10, 2013.
Lee, et al., "Not all Microseconds are Equal: Fine-Grained Per-Flow Measurements with Reference Latency Interpolation", SIGCOMM '10, Aug. 30-Sep. 3, 2010.

* cited by examiner

*Primary Examiner* — Jeffrey M Rutkowski
*Assistant Examiner* — Mehedi Aley
(74) *Attorney, Agent, or Firm* — McDermott Will & Emery LLP (57) ABSTRACT

Overlapping flow rules are included in a ternary content addressable memory (TCAM), while still enabling a hardware counter to increment each of the overlapping rules when a packet matching each of the overlapping rules is transmitted through the TCAM. In a given set of flow specifications, a first flow specification is identified that overlaps with a second flow specification. Rules are determined corresponding to the first flow specification, the second flow specification, and an intersection of the first and second flow specifications. Priorities are assigned to each of the rules, wherein the rule corresponding to the intersection is assigned a higher priority than the rules corresponding to the first and second flow specifications. Such rules are stored in the TCAM.

14 Claims, 9 Drawing Sheets

SYSTEM AND METHOD FOR MEASUREMENT OF FLOW STATISTICS

BACKGROUND

Traffic flow statistics are used in many network services and functions such as traffic engineering, network monitoring and traffic visualization, network anomaly detection and protection. Flow statistics may be measured through access control list (ACL) rules programmed into ternary content addressable memory (TCAM) banks of network routers. Each ACL rule counts the packets and/or bytes matching a predefined traffic flow specification, which may include source and/or destination internet protocol (IP), source and destination user datagram protocol (UDP), or transmission control protocol (TCP) flow.

One constraint of router hardware is that within each TCAM bank, a packet can only increment the counter of a single ACL rule, although it may match multiple ACL rules. Thus to collect statistics of flows that overlap and match a common subset of packets, a simple technique is to program ACL rules for such flows into different TCAM banks. This technique has very limited scalability as the number of TCAM banks is typically very small in router hardware.

SUMMARY

A system and method is provided for reducing the number of TCAM banks required for measurement of flow statistics, while providing flexible tradeoff between the number of TCAM banks and the number of ACL rules used.

One aspect of the technology provides a method, comprising receiving, at one or more processors, a set of flow specifications, and identifying within the set of flow specifications, using the one or more processors, a first flow specification that overlaps with a second flow specification. The method further comprises determining, using the one or more processors, a first rule corresponding to the first flow specification, determining, using the one or more processors, a second rule corresponding to the second flow specification, and determining, using the one or more processors, a third rule corresponding to an intersection of the first and second flow specifications. The one or more processors may assign priorities to each of the first, second, and third rules, wherein the third rule is assigned a higher priority than the first and second rules. Moreover, the first, second, and third rules may be stored in one or more router forwarding tables.

Another aspect of the disclosure provides a system, comprising a storage area storing one or more router forwarding tables, and a processor. The processor is configured to receive a set of flow specifications, and identify within the set of flow specifications a first flow specification that overlaps with a second flow specification. The processor is further configured to determine a first rule corresponding to the first flow specification, determine a second rule corresponding to the second flow specification, and determine a third rule corresponding to an intersection of the first and second flow specifications. Even further, the processor is configured to assign priorities to each of the first, second, and third rules, wherein the third rule is assigned a higher priority than the first and second rules, and store the first, second, and third rules in the one or more router forwarding tables.

Yet another aspect of the disclosure provides a non-transitory computer-readable medium storing instructions executable by one or more processors for performing a method. Such method comprises receiving a set of flow specifications and identifying within the set of flow specifications a first flow specification that overlaps with a second flow specification. Further, a first rule corresponding to the first flow specification, a second rule corresponding to the second flow specification, and a third rule corresponding to an intersection of the first and second flow specifications are determined. Priorities are assigned to each of the first, second, and third rules, wherein the third rule is assigned a higher priority than the first and second rules. The first, second, and third rules are stored in one or more router forwarding tables.

DETAILED DESCRIPTION

A total number of TCAM banks or TCAM entries in a network router may be reduced, for example, to facilitate measurement of flow statistics. For example, because a packet may match multiple ACL rules, the multiple ACL rules may be added to a given TCAM bank such that a counter can simultaneously increment the count for each of the multiple rules when the packet is forwarded through the TCAM.

The number of TCAM banks may be minimized, or the number of TCAM entries may be minimized, depending on capabilities of the hardware supporting the TCAMs. A similar computation may be used for both scenarios. In this computation, a first input comprises a set of traffic flow specifications for which statistics are to be measured. The flow specifications may include source and/or destination IP, source and destination UDP, or TCP flow. A second input represents the number of TCAM banks available for implementing the statistics for flow specifications. If a minimum number of TCAM banks is desired, the second input may be set to 1. If a minimum number of TCAM entries is desired, the second input may be set to the highest number of TCAM banks available in the hardware.

The set of flow specifications may be converted to a graph, where each node of the graph represents a flow specification. An edge exists between two nodes if two flow specifications match a common subset of packets. Each node in the graph may be assigned a color, where each color corresponds to one TCAM bank. Two adjacent nodes, representing overlapping flow specifications, will be assigned different colors.

If the number of colors in the graph is greater than the second input (representing the number of TCAM banks available), the graph may be reduced to a graph which has the same number of nodes but fewer edges. For example, an edge between overlapping flow specifications may be removed, and the two flow specifications may be assigned to the same TCAM, if an extra ACL rule is installed to address the overlap. By removing an edge, a maximum degree between two nodes is reduced, and the number of different colors required may be reduced. To minimize the number of edges removed, and thus minimize the number of additional ACL rules to be installed, edges of highest degree nodes may be removed first. Also, for a given node, edges attached to neighbors of higher degree may be removed in preference to removing edges of lower-degree neighbors. This graph reduction may be reiterated until the number of colors in the graph is less than or equal to the second input.

If the number of colors in the graph is less than or equal to the second input, an output may be computed to implement the first input in the number of TCAMS corresponding to the number of colors in the reduced graph. In computing the output, the priorities of each flow specification assigned a given color may be determined. The TCAM bank for that given color may be populated with entries corresponding to the flow specifications, ranked by priority. The number of output ACL rules may be larger than the number of input flow specifications if overlapping flow specifications are assigned to a common TCAM bank.

Figure 1:
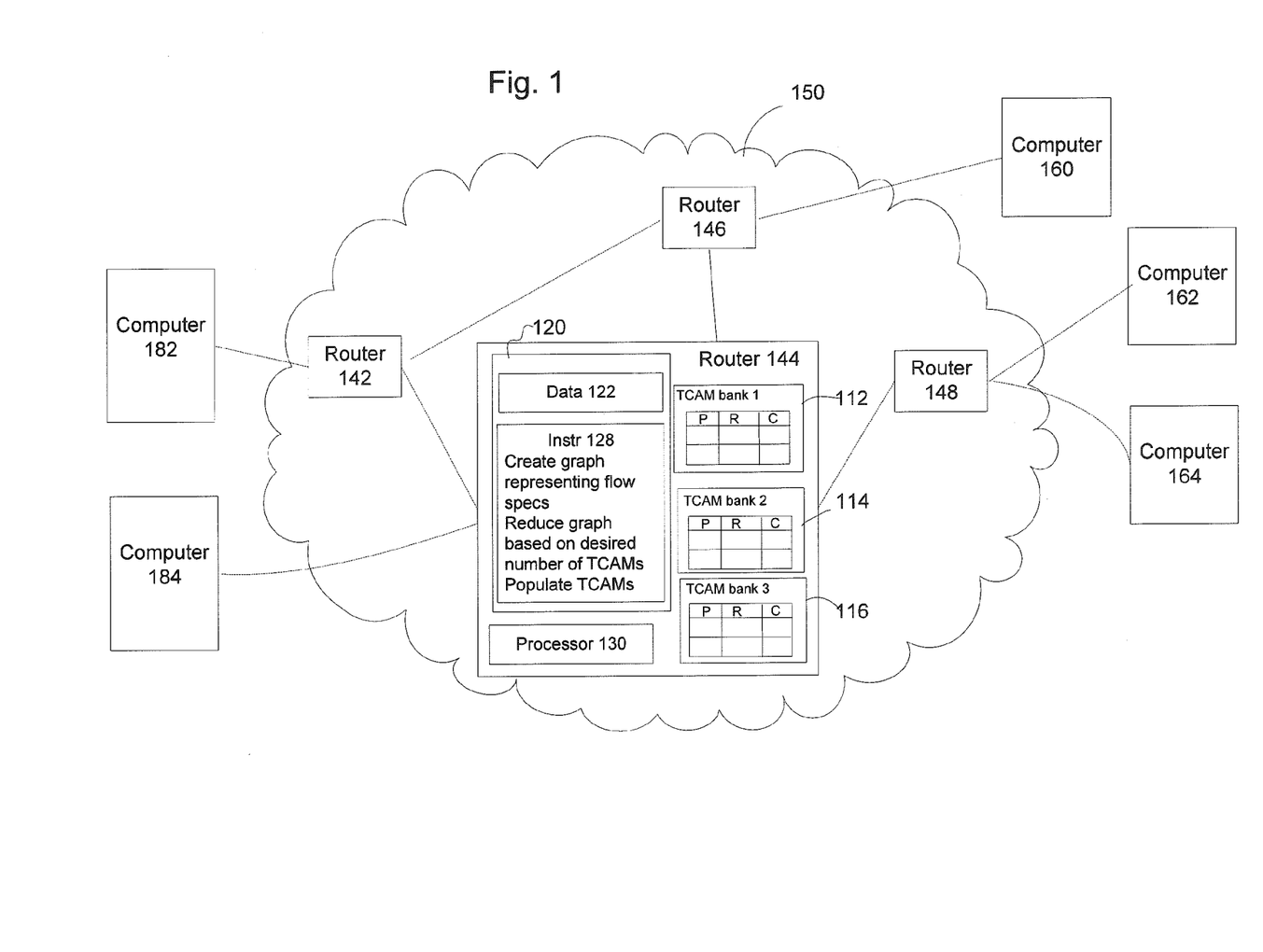
FIG. 1 is a system diagram according to an aspect of the disclosure.

FIG. 1 illustrates an example network 150 that joins a plurality of client computers 160, 162, 164, 182, 184. The network 150 includes a plurality of routers 142, 144, 146, 148. Each router may include a processor 130 and a memory 120 coupled to the processor 130. Each router 142-148 may further include one or more input ports for receiving data from other routers or computing devices, such as packets or program updates. Similarly, each router 142-148 may have one or more output ports for transmitting data through the network 150.

Each router 142-148 may also include one or more packet forwarding tables. For example, the router 144 includes TCAM banks 112, 114, and 116. Further, each router may have a processor and a memory, such as memory 120 of the router 144, which stores data 122 and instructions 128, for example, for reducing and populating a number of TCAM banks used in measuring flow statistics. While the TCAM banks 112-116 are shown as being stored separately from memory 120, the TCAM banks 112-116, data 122, and instructions 128 may all be stored in the same medium. Moreover, while the present example is described using routers, the routers may be switches or any other devices through which data packets are transmitted. Similarly, the TCAMs may be any type of router forwarding table.

The memory 120 stores information accessible by processor 130, including instructions 128, and data 122 that may be executed or otherwise used by the processor 130. The memory 120 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 128 may be any set of instructions to be executed directly (such as machine code) or indirectly (such as scripts) by the processor 130. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 122 may be retrieved, stored or modified by processor 130 in accordance with the instructions 128. For instance, although the system and method is not limited by any particular data structure, the data may be stored in computer registers, in a relational database as a table having a plurality of different fields and records, XML documents or flat files. The data may also be formatted in any computer-readable format. The data may comprise any information sufficient to identify the relevant information, such as numbers, descriptive text, proprietary codes, references to data stored in other areas of the same memory or different memories (including other network locations) or information that is used by a function to calculate the relevant data.

The processor 130 may be any conventional processor, such as processors in commercially available routers. Alternatively, the processor may be a dedicated controller such as an ASIC or other hardware-based processor. The processor and memory may actually comprise multiple processors and memories that may or may not be stored within the same physical housing. For example, memory may be a hard drive or other storage media located in a server farm of a data center. Accordingly, references to a processor, memory, or computer will be understood to include references to a collection of processors, memories or computers that may or may not operate in parallel.

The computers 160, 162, 164, 182, 184 may be any of a variety of computing devices, including personal digital assistants (PDAs), laptops, tablet PCs, netbooks, PCs, etc. These devices may be connected to the network 150 via a wired connection, such as through a modem, or wirelessly, such as through an access point in communication with one of the routers 142-148. Although only a few computers are depicted in FIG. 1, it should be appreciated that a typical system can include a large number of connected computers, with each different computer being at a different node of the network 150. The network, and intervening nodes, may comprise various configurations and protocols including the Internet, World Wide Web, intranets, virtual private networks, wide area networks, local networks, private networks using communication protocols proprietary to one or more companies, Ethernet, WiFi (such as 802.11, 802.11b, g, n, or other such standards), and HTTP, and various combinations of the foregoing. Such communication may be facilitated by any device capable of transmitting data to and from other computers, such as modems (e.g., dial-up, cable or fiber optic) and wireless interfaces.

As packets flow from, for example, computer 182 to computer 162, information in the packets is used to determine how the packet should be routed. For example, router 142 may use packet information to determine that the next hop should be router 144, and router 144 receives the packet and determines that the next hop should be router 148. One mechanism used by the routers (e.g., router 144) to make such determinations is the TCAM banks 112-116. Each TCAM bank 112-116 includes one or more TCAM entries, and each entry stores a flow rule in order of priority. As the packets flow through the TCAM banks 112-116, a counter may track the number of packets matching each flow rule. For example, any or all of the TCAM banks 112-116 may store overlapping flow rules, along with additional higher priority flow rules corresponding to the intersection of the overlapping rules. In this regard, when a packet matching multiple flow rules passes through the TCAM, a packet count for each of the multiple flow rules may simultaneously be incremented.

While the foregoing and following examples describe structuring TCAMs in the context of measuring flow statistics, it should be understood that the techniques described in these examples may be used for any purpose.

Figure 2:
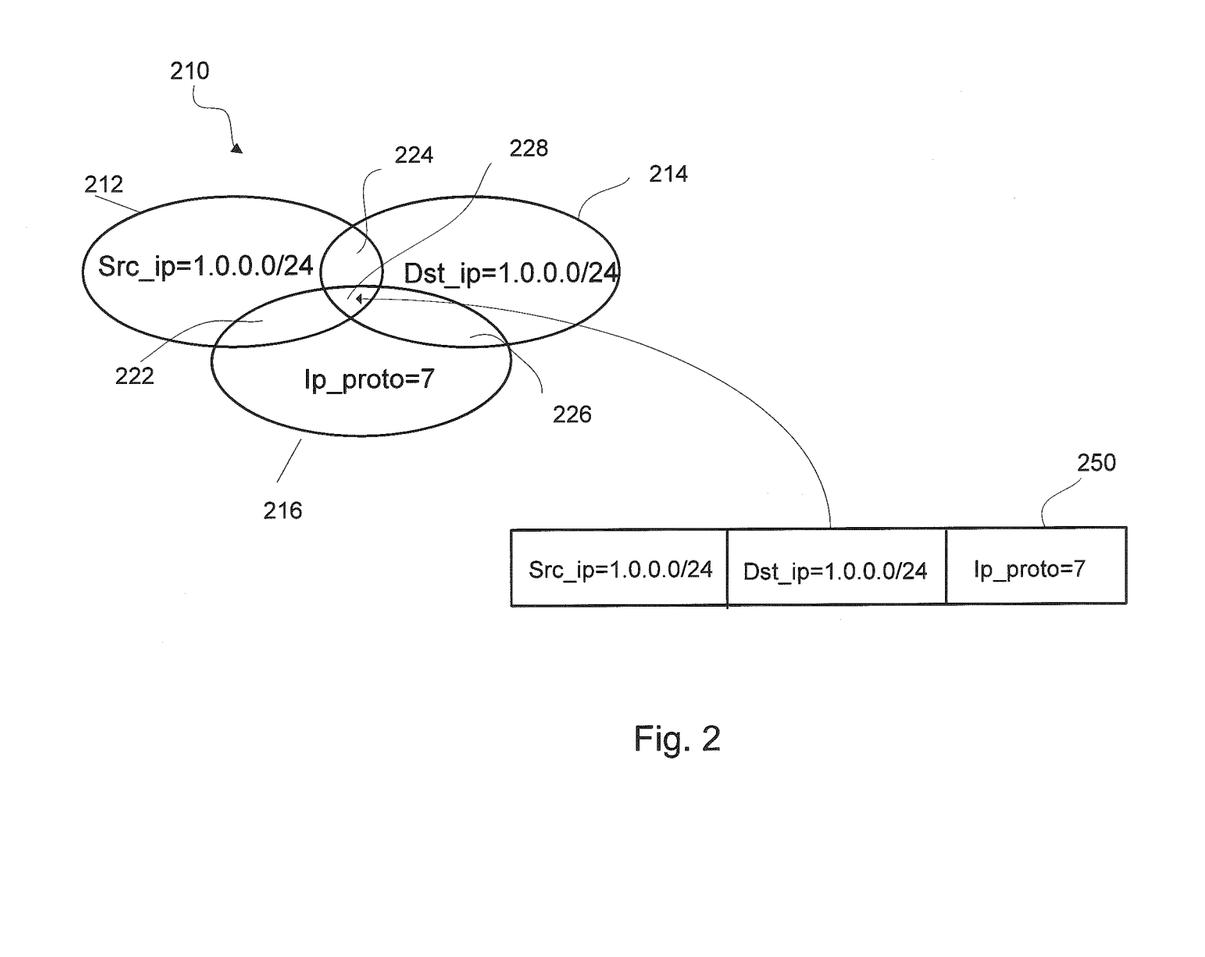
FIG. 2 illustrates example flow specifications according to aspects of the disclosure.

FIG. 2 illustrates an example set 210 of flow specifications 212, 214, 216. Flow specification 212 matches a source Internet Protocol (IP) address of 1.0.0.0/24, flow specification 214 matches a destination IP address of 1.0.0.0/24, and flow specification 216 matches an IP protocol of 7. Each of these flows 212-216 overlap with each other, such that some packets may match two or more of the flows 212-216. For example, packet 250 matches each of flow specifications 212-216. Intersection 222 represents an overlap between flow specification 212 and flow specification 216; intersection 224 represents an overlap between flow specification 212 and flow specification 214; and intersection 226 represents an overlap between flow specification 214 and flow specification 216. Intersection 228 represents an overlap among each of the flow specifications 212-216.

Figure 3:
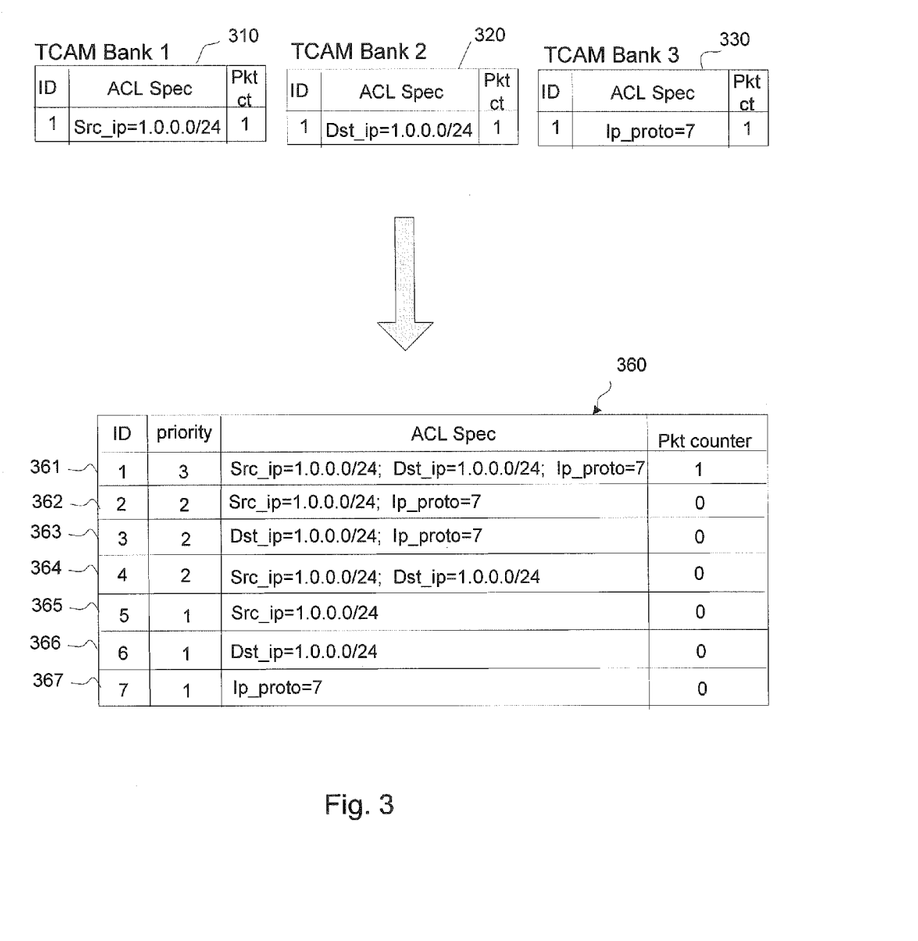
FIG. 3 illustrates an example forwarding table according to aspects of the disclosure.

FIG. 3 shows an example TCAM bank 360, which may be used to increment the packet count of multiple flows matching a given packet. Rather than storing each overlapping flow specification in separate TCAM banks 310-330, the TCAM bank 360 includes all of the rules, as shown in entries 365, 366, 367. The TCAM bank 360 further includes additional rules of higher priority, shown in entries 361-364. The higher priority rules explicitly count packets belonging to intersections of the set of original flow specification 210. For example, the rule in entry 361 matches packets belonging to the intersection 228 of FIG. 2, such as the packet 250. The rule in entry 362 matches packets belonging to the intersection 222. The rule in entry 363 matches packets belonging to the intersection 226. The rule in entry 364 matches packets belonging to the intersection 224.

Using the TCAM bank 360 of FIG. 3, traffic statistics of each original flow specification 212-216 are derived as the sum of traffic statistics of multiple ACL rules. The multiple ACL rules either match a given flow specification itself, or they match an intersection between at least a first flow specification and a second flow specification. For example, a packet having address information of {src_ip=1.0.0.0; Dst_ip=1.1.1.1; ip_proto=5} would match the flow specification 212 of FIG. 2, and therefore increment the packet count of only TCAM entry 365. As another example, a packet having address information of {src_ip=1.0.0.0; Dst_ip=1.0.0.0; ip_proto=5} would match the intersection 224 of flow specification 212 and flow specification 214, and thus would increment the packet count corresponding to entry 364 in the TCAM 360 of FIG. 3. Such packet would only increment the count for the ACL rule in entry 364, however as opposed to also incrementing the counts for the ACL rules in entries 365 and 366. With this implementation, traffic statistics of all three flow specifications 212-216 will be incremented upon arrival of the packet 250 of FIG. 2, with {src_ip=1.0.0.0; dst_ip=1.0.0.0; ip_proto=7}, although only one hardware ACL counter for the rule in entry 361 will be incremented.

Figure 4:
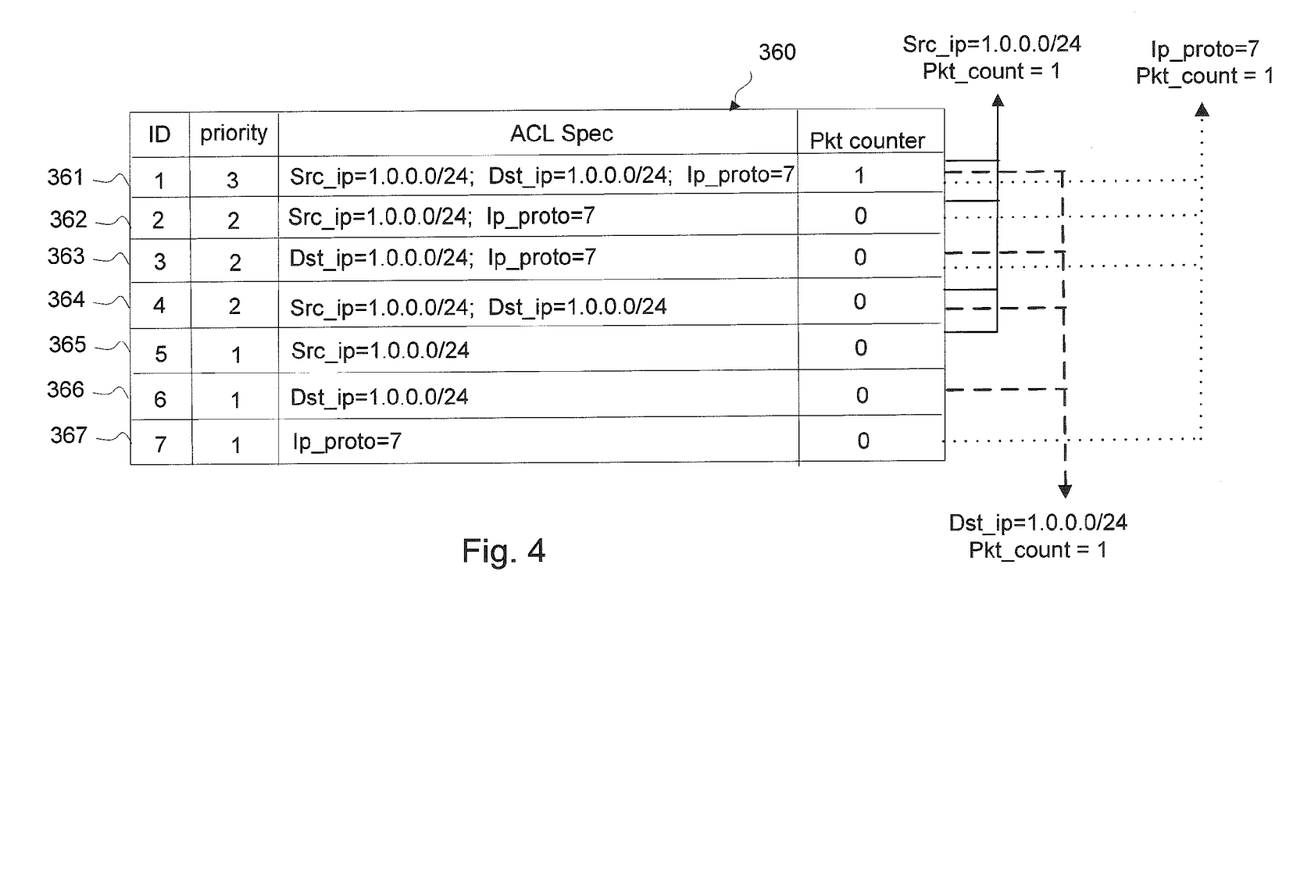
FIG. 4 illustrates an example forwarding table according to aspects of the disclosure.

The packet counts, which are incremented as described above, are summed as shown in the example of FIG. 4 to derive the traffic statistics. For example, the packet count of all packets including the flow specification {src_ip=1.0.0.0/24} is the sum of packet counts of the ACL rules in entries 361, 362, 364, and 365. Similarly, the packet count of all packets including the flow specification {dst_ip=1.0.0.0/24} is the sum of packet counts of the ACL rules in entries 361, 363, 364, and 366. Further, the packet count of all packets including the flow specification {ip_proto=7} is the sum of packet counts of the ACL rules in entries 361, 362, 363, and 367.

Figure 5:
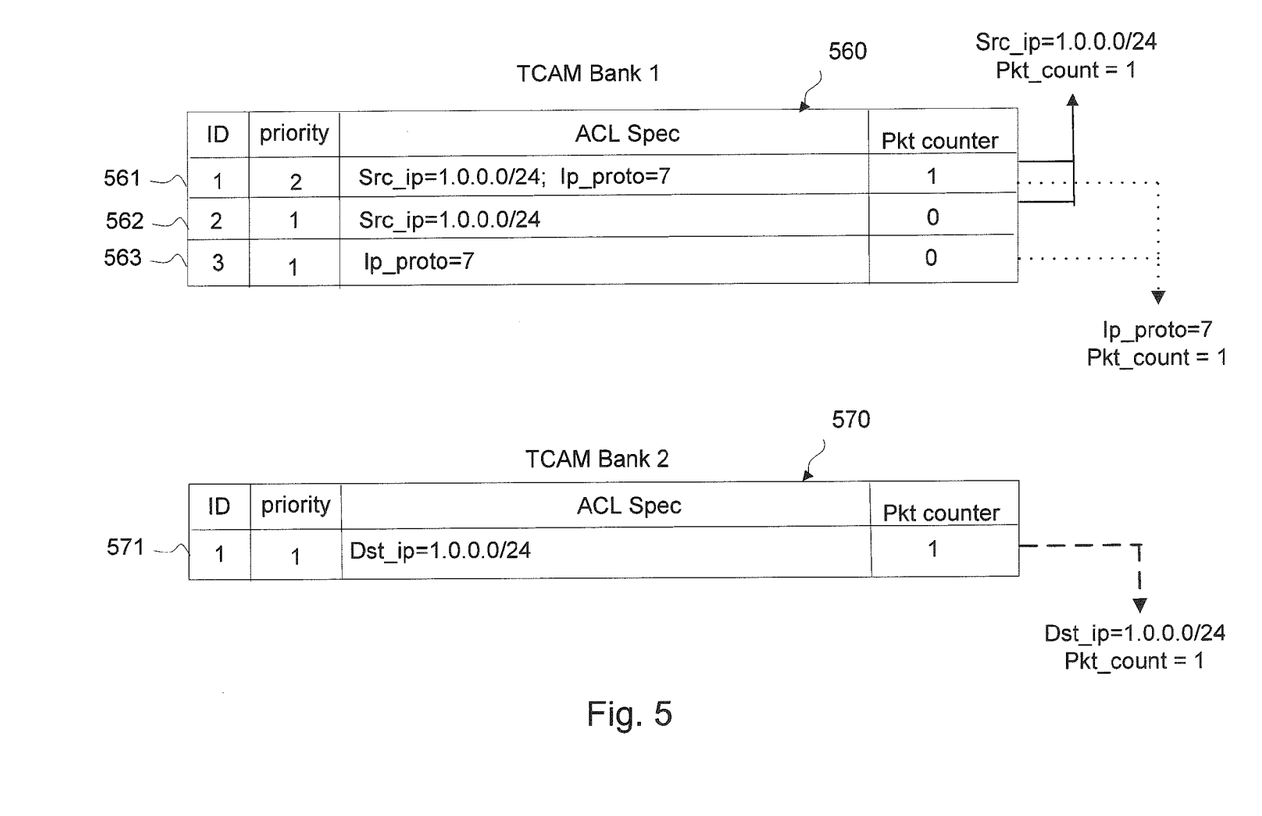
FIG. 5 illustrates another example of forwarding tables according to aspects of the disclosure.

FIG. 5 shows an example using more than one TCAM bank, but less than a separate TCAM bank for each flow specification 212-216. While more TCAM banks are used in this example, a total number of ACL rules installed on the TCAMs is lower.

As shown in FIG. 5, two flow specifications, e.g., the flow specifications 212, 216 of FIG. 2, are implemented by three ACL rules in entries 561-563 in a first TCAM bank 560. The last flow specification, e.g., the flow specification 214 of FIG. 2, is implemented by one ACL rule in entry 571 in a second TCAM bank 570. According to this example, when a packet with {src_ip=1.0.0.1; dst_ip=1.0.0.2; ip_proto=7} arrives, two hardware ACL counters will be incremented. One counter that will be incremented corresponds to the original flow specification 214 matching dst_ip of 1.0.0.0/24, as shown in the entry 571 of the second TCAM 570. The other counter that will be incremented corresponds to the intersection 222 between the two flow specifications 212, 216 matching src_ip of 1.0.0.0/24 and ip_proto of 7, as shown in entry 561 of the first TCAM 560. The increment of ACL counter in the entry 561 of the first TCAM 560 triggers the traffic statistics of two flow specifications 212, 216, matching src_ip of 1.0.0.0/24 and ip_proto of 7 respectively, to be incremented.

Figure 6:
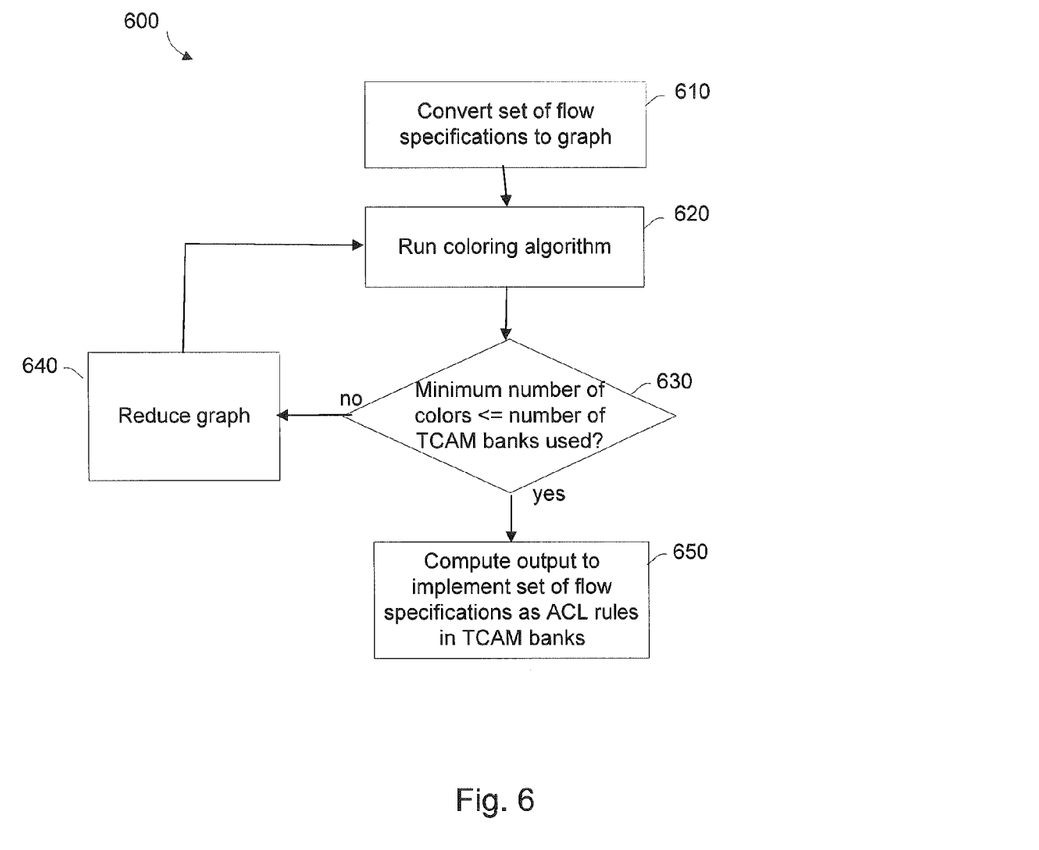
FIG. 6 is a flow diagram of an example method according to aspects of the disclosure.

FIG. 6 illustrates a method 600 of populating TCAM banks for measuring flow statistics. This method 600 also provides flexible tradeoff between the number of TCAM banks and the number of ACL rules used.

In block 610, a set of flow specifications to output traffic statistics is converted into a graph. For example, each flow specification may be represented by a node or vertex. An edge exists between two vertices if the two flow specifications represented by those vertices overlap. For example, if a common subset of packets match two flow specifications, an edge representing the overlap will exist between the two vertices representing those flow specifications.

In block 620, a graph coloring algorithm is run to assign a color to each vertex created in block 610. Each color corresponds to a TCAM bank. Two overlapping flow specifications represented by two adjacent vertices will be assigned different colors and thus TCAM banks. Otherwise, a minimum number of colors (k) is used. While this example describes differentiating the vertices of the graph using color, it should be understood that any other technique for differentiating the vertices may be used, such as shading, numbering, or the like.

In block 630, the minimum number of colors (k) as determined by the coloring algorithm is compared to a given number of TCAM banks to be used to implement the set of flow specifications. For example, the number of TCAM banks to be used may be determined based on hardware resource constraints, user input, or any of a number of other factors. If the number of colors is smaller or equal to the number of TCAM banks to be used, the method proceeds to an output stage in block 650. If not, the method 600 proceeds to block 640.

In block 640, the graph is reduced to include the same number of vertices but fewer edges. Reducing the graph is explained in more detail below in connection with FIG. 8. After reducing the graph, the method 600 returns to block 620 where the coloring algorithm is rerun to determine the minimum number (k) of TCAM banks or colors required to implement the flow specifications 210 with additional ACL rules. The cycle of blocks 620, 630, 640 may be repeated until a result of block 630 is true.

In block 650, an output is computed to implement the set of flow specifications as ACL rules in the determined number (k) of TCAM banks. A number of ACL rule sets in a given TCAM bank is larger than the number of flow specifications in the TCAM bank if overlapping flow specifications are assigned to a common TCAM bank. For example, additional ACL rules are required to count packets matching the intersections of multiple flow specs assigned to one TCAM bank, as discussed in connection with FIGS. 3-5. A method of computing the output is explained in further detail in connection with FIG. 9.

According to one example, the method 600 may also be expressed using the following pseudo code:

```
Input:
    F = {f_i} (the set of flow specifications to output the traffic
    statistics)
        f_i: a single flow specification to output traffic statistics such
        as packet and/or byte counter
        |F|: the number of flow specifications. in F
    K: number of TCAM banks used
Output:
    R = {R_i} (the set of ACL rules for implementing the traffic
    statistics as defined in F)
        R_i: the set of ACL rules installed in ith TCAM bank.
        |R|: the number of ACL rule sets in R
Pseudo code
    For f_i in F:
        V += {v_i}
    For v_i in V:
        For v_j in V:
            if f_i ∩ f_j ≠ ϕ:
                E += {(v_i, v_j)}
    G = {V, E}
    assign_tcam(G, F)
    while G.num_color > K:
        G = reduce(G, 1)
        assign_tcam(G, F)
    For f_i in F:
        For r_j in R:
            if (f_i.tcam_bank == r_j.tcam_bank):
                r = f_i ∩ r_j
                r.priority = r_j.priority + 1
                if r ≠ ϕ:
                    R += {r}
```

In the above pseudo code, the function assign_tcam(G, F) runs the graph coloring algorithm to assign each vertex v in graph G a color c, where v corresponds to a flow rule f in the set of flow specifications F, and c corresponds to a TCAM bank for implementing traffic statistics of f. Another function in the above pseudo code, reduce(G, m), eliminates edges in the graph G to reduce the maximum node degree in G by a value m. As the number of colors generally increases with the maximum node degree, a reduced graph is likely to need fewer colors and thus TCAM banks.

Figure 7A:
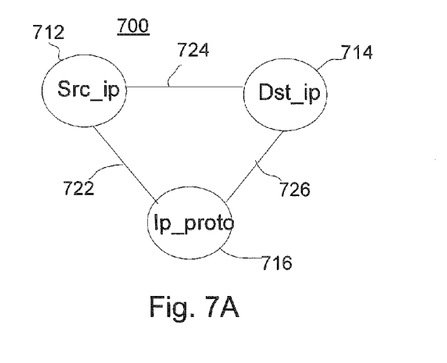
FIGS. 7A-7F are example graphs according to aspects of the disclosure.

FIGS. 7A-7F provide example graphical illustrations of the method 600, using the set of flow specifications 210 of FIG. 2. As shown in FIG. 7A, a graph 700 includes three vertices 712, 714, 716. Vertex 712 represents the flow specification 212, vertex 714 represents the flow specification 214, and vertex 716 represents flow specification 216. The edges 722, 724, 726 correspond to the intersections 222, 224, 226 of FIG. 2. For example, the edge 722 represents an overlap between the flow specifications 212, 216; the edge 724 represents an overlap between the flow specifications 212, 214; and the edge 726 represents an overlap between the flow specifications 714, 716.

Figure 7B:
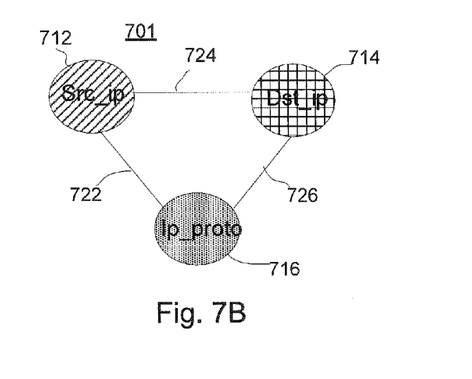

FIG. 7B illustrates a colored graph 701, corresponding to the graph 700 after the coloring algorithm is run. Because each of the vertices 712-716 are connected by an edge, representing an overlap between the flow specifications, each vertex 712, 714, 716 is assigned a different color. While three different colors are used, it may be determined, for example, that only two TCAM banks will be used to implement the flow specifications. Accordingly, the graph may be reduced.

Figure 7C:
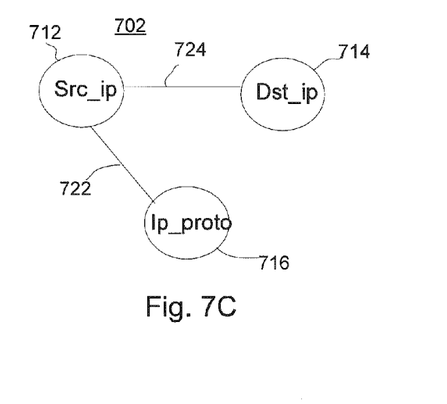
Figure 7D:
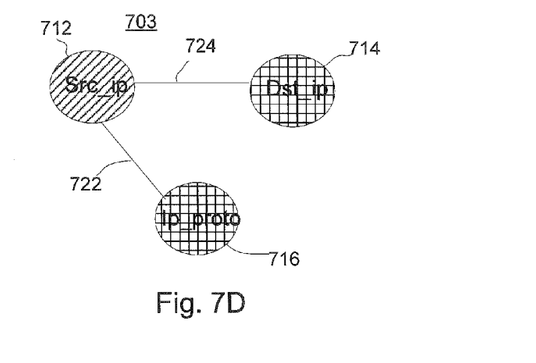

FIG. 7C illustrates a reduced graph 702, where the edge between vertices 714 and 716 has been removed. Because this edge was removed, vertices 714 and 716 may be assigned the same color, as shown in FIG. 7D. Therefore, only two colors are required in reduced graph 703. Because this is equal to the specified number of TCAM banks to be used, further reduction is not needed.

Figure 7E:
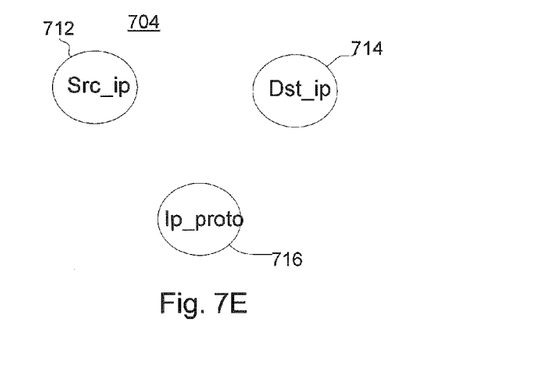
Figure 7F:
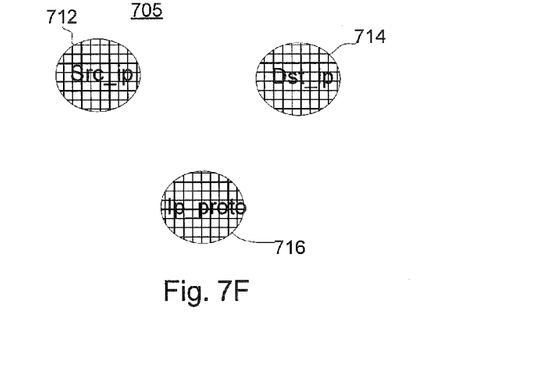

According to some examples, however, the graph may be even further reduced. For example, if it is desired that only one TCAM bank is used, the graph may be further reduced until only one color is needed for all vertices. FIG. 7E illustrates a further reduced graph 704, where all edges have been removed. As shown in colored graph 705 of FIG. 7F, when the coloring algorithm is run on the graph 704 it is determined that only one color is required.

Figure 8:
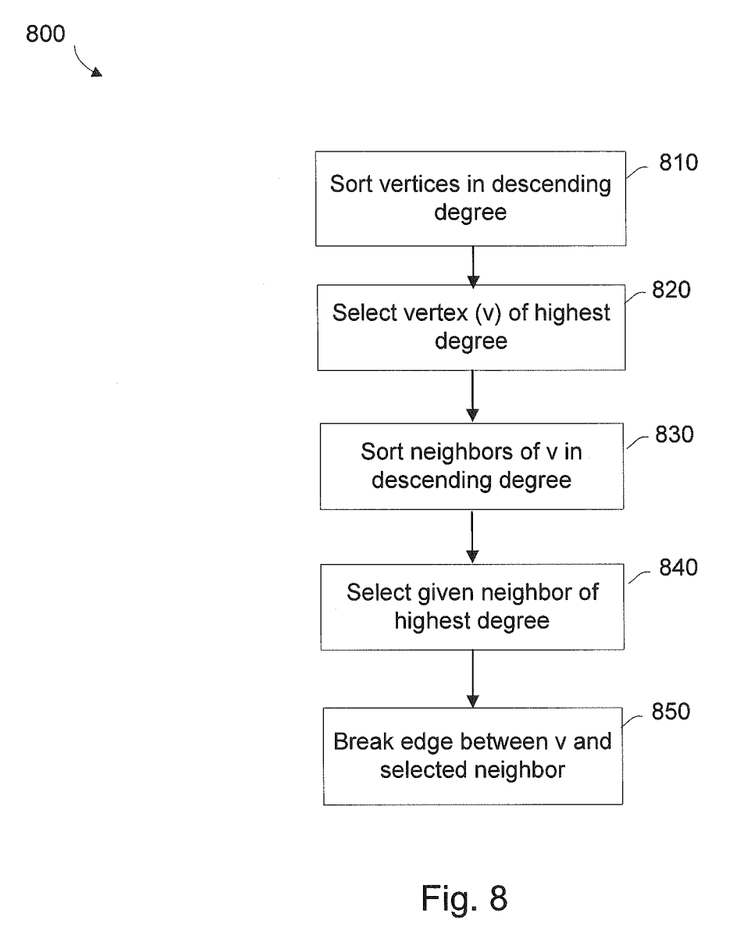
FIG. 8 is a flow diagram of another example method according to aspects of the disclosure.

FIG. 8 provides a flow diagram illustrating an example method 800 for reducing the graph, for example, as in block 640 of FIG. 6. According to one example the graph is reduced by removing edges between vertices. If an edge between two vertices representing intersecting flow specifications is removed, and the two flow specifications are assigned to the same TCAM bank, an extra ACL rule will be installed to match the intersection of the two flow specifications. Accordingly, the method 800 minimizes the number of edges removed to reduce the total number of extra ACL rules to be installed.

In block 810, the vertices or nodes in the graph are sorted in descending degree, wherein the degree corresponds to a total number of edges extending from the vertex. For example, referring back to FIG. 7C, the vertex 712 has a degree of two, while the vertex 716 has a degree of one.

In block 820, a vertex (v) of highest degree is selected. Reducing the graph starting with the vertex v of highest degree helps to minimize the number of extra ACL rules that will need to be installed.

In block 830, neighbors of the vertex v are sorted in descending degree. A neighbor of the highest degree vertex v is selected (block 840). According to one example, the neighbor is selected by degree, e.g., the selected neighbor has the highest degree of all vertices connected to the vertex v.

In block 850, an edge between the vertex v and the selected neighbor is broken. Selecting the edge between the highest degree vertex v and its neighbor of highest degree for removal also serves to minimize the number of extra ACL rules to be installed.

According to one example, the method 800 may also be expressed using the following pseudo code

```
reduce(G)
    sort(V) // sort nodes in descending node degree
    For v in V:
        If v.degree > (G.degree m):
            num_round = v.degree G.degree + m
            sort(v.neighbors) // sort the neighbors of v in descending
```

```
node degree
For v_j, in v.neighbors:
    E -= {(v, v_j)}
    v.degree;
    If (v.degree <= (G.degree m)):
        break;
```

Figure 9:
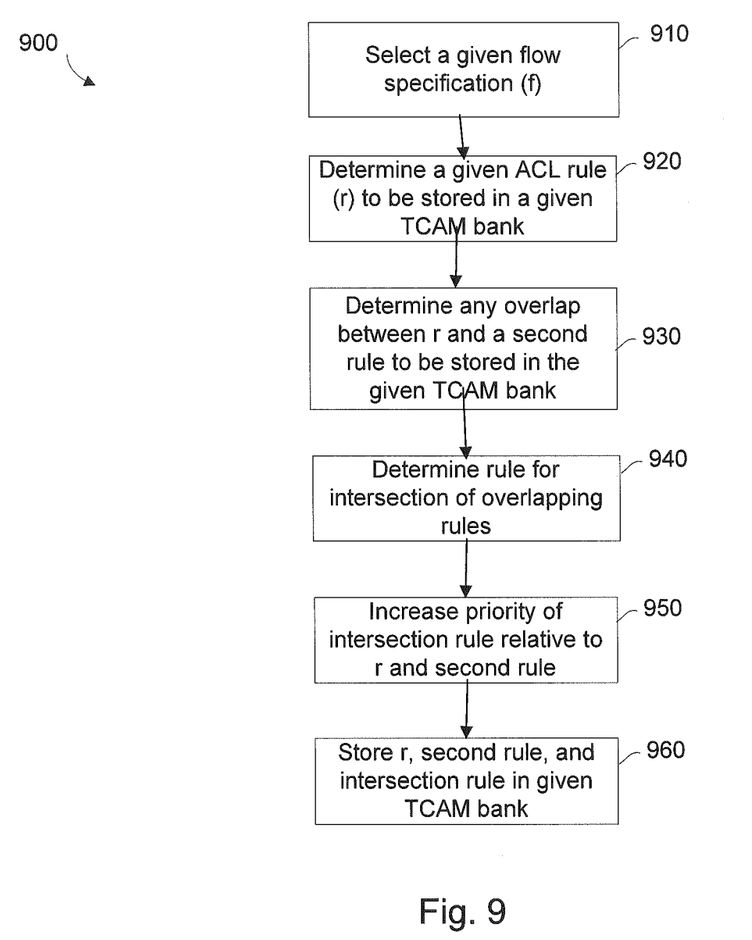
FIG. 9 is a flow diagram of another example method according to aspects of the disclosure.

FIG. 9 provides a flow diagram illustrating an example method 900 of computing output, such as in block 650 of FIG. 6.

In block 910, a given flow specification (f) is selected. For example, the selection may be based on a particular color of a vertex representing the flow specification, such that all like-colored vertices resulting from the method 600 are stored in the same TCAM bank.

In block 920, a given ACL rule (r) corresponding to the flow specification f is determined. The rule r may be determined based on, for example, the flow specification f itself or a given TCAM bank in which the rule r will potentially be stored.

In block 930, it is determined whether there is any overlap between the rule r and any other rules to be stored in the given TCAM bank. For example, the rules corresponding two like-colored vertices may be determined to overlap.

In block 940, a rule for the intersection of the overlapping rules may be determined. For example, if rule {src_ip=1.0.0.0/24} is determined to overlap with rule {ip_proto=7}, intersecting rule {src_ip=1.0.0.0/24; ip_proto=7} may be generated.

In block 950, a priority of the intersecting rule is increased relative to the rule r and the second rule that overlaps with r. Following the previous example, the intersecting rule {src_ip=1.0.0.0/24; ip_proto=7} may have a priority of 2, while each of the rules {src_ip=1.0.0.0/24} and {ip_proto=7} has a priority of 1. The rule r, the second rule, and the intersecting rule are then all stored in the given TCAM bank.

It should be understood that the operations involved in the above methods need not be performed in the precise order described. Rather, various operations may be handled in a different order or simultaneously, and operations may be added or omitted.

The above described methods may be implemented as software (e.g., executable code stored in memory 120) and executed by a processor in the router. Alternatively, the software may be stored remotely. This software application may be automatically run, for example, each time flow statistics will be measured.

The systems, methods, and examples described above are advantageous in that they simplify measurement of flow statistics. For example, a packet matching multiple rules in a single TCAM may increment the packet count for each of those rules. In this regard, a number of TCAM banks needed is reduced, and statistics are measured more accurately and efficiently. Additionally, memory space is conserved, enabling the routers to operate more efficiently.

As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
    receiving, at one or more processors, a set of flow specifications;
    identifying within the set of flow specifications, using the one or more processors, a first flow specification that overlaps with a second flow specification;
    determining, using the one or more processors, a first rule to be applied to packet flows satisfying the first flow specification;
    determining, using the one or more processors, a second rule to be applied to packet flows satisfying the second flow specification;
    determining, using the one or more processors, a third rule to be applied to packet flows satisfying an intersection of the first and second flow specifications;
    assigning, using the one or more processors, priorities to each of the first, second, and third rules, wherein the third rule is assigned a higher priority than the first and second rules;
    storing the first, second, and third rules in one or more router forwarding tables;
    selecting a number of the router forwarding tables in which to store the set of flow specifications;
    determining, using the one or more processors, which flow specifications will be assigned to a same one of the router forwarding tables, wherein determining which flow specifications will be assigned to the same router forwarding table comprises generating a graph corresponding to the set of flow specifications, the graph including a plurality vertices and one or more edges, each vertex representing a particular flow specification and each edge representing an intersection between two flow specifications; and
    routing at least one data packet over at least one network link based on at least one of the first, second, and third rules stored in the one or more router forwarding tables.

2. The method of claim 1, further comprising differentiating each vertex in the graph based on the edges connected to the vertex.

3. The method of claim 2, wherein the vertices are differentiated by color.

4. The method of claim 1, further comprising reducing the graph to eliminate one or more edges.

5. The method of claim 4, wherein reducing the graph comprises:
    selecting a first vertex having a highest degree;
    selecting a neighboring vertex, the neighboring vertex having a highest degree among all vertices connected to the first vertex; and
    removing an edge between the first vertex and the neighboring vertex.

6. A system, comprising:
    a storage area storing one or more router forwarding tables; and a processor configured to:
receive a set of flow specifications;
identify within the set of flow specifications a first flow specification that overlaps with a second flow specification;
determine a first rule to be applied to packet flows satisfying the first flow specification;
determine a second rule to be applied to packet flows satisfying the second flow specification;
determine a third rule corresponding to be applied to packet flows satisfying an intersection of the first and second flow specifications;
assign priorities to each of the first, second, and third rules, wherein the third rule is assigned a higher priority than the first and second rules;
store the first, second, and third rules in the one or more router forwarding tables;
select a number of the router forwarding tables in which to store the set of flow specifications;
determine, using the one or more processors, which flow specifications will be assigned to a same one of the router forwarding tables, wherein determining which flow specifications will be assigned to the same router forwarding table comprises generating a graph corresponding to the set of flow specifications, the graph including a plurality vertices and one or more edges, each vertex representing a particular flow specification and each edge representing an intersection between two flow specifications; and
route at least one data packet over at least one network link based on at least one of the first, second, and third rules stored in the one or more router forwarding tables.

7. The system of claim 6, wherein the router forwarding tables are ternary content addressable memories (TCAMs).

8. The system of claim 6, wherein the processor further differentiates each vertex in the graph based on the edges connected to the vertex.

9. The system of claim 8, wherein the vertices are differentiated by color.

10. The system of claim 6, wherein the processor further reduces the graph to eliminate one or more edges.

11. The system of claim 10, reduces the graph by:
wherein the processor selecting a first vertex having a highest degree;
selecting a neighboring vertex, the neighboring vertex having a highest degree among all vertices connected to the first vertex; and
removing an edge between the first vertex and the neighboring vertex.

12. The system of claim 10, further comprising a router, wherein the memory and the processor are located in the router.

13. A non-transitory computer-readable medium storing processors for instructions executable by one or more performing a method, the method comprising:
receiving a set of flow specifications;
identifying within the set of flow specifications a first flow specification that overlaps with a second flow specification;
determining a first rule to be applied to packet flows satisfying the first flow specification;
determining a second rule to be applied to packet flows satisfying the second flow specification;
determining a third rule to be applied to packet flows satisfying an intersection of the first and second flow specifications;
assigning priorities to each of the first, second, and third rules, wherein the third rule is assigned a higher priority than the first and second rules;
storing the first, second, and third rules in one or more router forwarding tables;
selecting a number of the router forwarding tables in which to store the set of flow specifications;
determining, using the one or more processors, which flow specifications will be assigned to a same one of the router forwarding tables, wherein determining which flow specifications will be assigned to the same router forwarding table comprises generating a graph corresponding to the set of flow specifications, the graph including a plurality vertices and one or more edges, each vertex representing a particular flow specification and each edge representing an intersection between two flow specifications; and
routing at least one data packet over at least one network link based on at least one of the first, second, and third rules stored in the one or more router forwarding tables.

14. The non-transitory computer-readable medium of claim 13, the method further comprising reducing the graph to eliminate one or more edges.

* * * * *